United States Patent
Montividas et al.

(10) Patent No.: US 8,312,761 B1
(45) Date of Patent: Nov. 20, 2012

(54) RESPIRATOR TEST ACCESSORY

(75) Inventors: Robert Montividas, Lino Lakes, MN (US); Richard Remiarz, Vadnais Heights, MN (US); Brian Johnson, Stillwater, MN (US); Max Carideo, St. Paul, MN (US)

(73) Assignee: TSI, Incorporated, Shoreview, MN (US)

( * ) Notice: Subject to any disclaimer, the term of this patent is extended or adjusted under 35 U.S.C. 154(b) by 634 days.

(21) Appl. No.: 12/491,049

(22) Filed: Jun. 24, 2009

Related U.S. Application Data

(60) Provisional application No. 61/075,241, filed on Jun. 24, 2008.

(51) Int. Cl.
*G01M 3/02* (2006.01)

(52) U.S. Cl. .................... 73/40; 128/202.22

(58) Field of Classification Search ...... 73/40; 434/262, 434/267, 270; 128/201.22, 201.23, 206.22, 128/206.24, 206.25, 206.27
See application file for complete search history.

(56) References Cited

U.S. PATENT DOCUMENTS

| | | | |
|---|---|---|---|
| 2,764,505 A | | 9/1956 | Kilbourne, Jr. et al. |
| 3,484,337 A | | 12/1969 | Starita |
| 3,514,314 A | | 5/1970 | Nemeth |
| 3,856,731 A | | 12/1974 | Shinomura |
| 3,965,418 A | | 6/1976 | Bauer et al. |
| 4,180,490 A | | 12/1979 | Maclean |
| 4,691,556 A | * | 9/1987 | Mellander et al. ........... 73/12.01 |
| 4,796,467 A | | 1/1989 | Burt et al. |
| 4,808,323 A | | 2/1989 | Fisher et al. |
| 4,914,957 A | | 4/1990 | Dougherty |
| 5,038,305 A | | 8/1991 | Kumar et al. |
| 5,289,819 A | | 3/1994 | Kroger et al. |
| 5,296,129 A | | 3/1994 | Ikeda et al. |
| 5,808,182 A | | 9/1998 | Stumpf |
| 6,066,243 A | | 5/2000 | Anderson et al. |
| 6,435,009 B1 | | 8/2002 | Tilley |
| 6,571,191 B1 | | 5/2003 | York et al. |
| 6,611,208 B1 | | 8/2003 | Ketler |
| 6,639,003 B2 | | 10/2003 | Borsinger et al. |

(Continued)

FOREIGN PATENT DOCUMENTS

EP 1 462 130 B1 9/2004

OTHER PUBLICATIONS

Air Techniques International, Operator's Manual for the TDA-99B, Respirator Function Tester, Version B, Maryland, published prior to Jun. 2008.

(Continued)

*Primary Examiner* — Daniel Larkin
(74) *Attorney, Agent, or Firm* — Patterson Thuente Christensen Pedersen, P.A.

(57) ABSTRACT

A test accessory for testing a variety respirators. The accessory is designed to compliment existing equipment to provide a robust assessment of respirator performance. The accessory may include a head form having an inflatable bladder capable of fitting a variety of sizes of respirator masks. In some embodiments, the inflatable bladder does not rely on adhesives to effect a seal, thereby eliminating manufacturing and quality assurance steps. The test accessory may also include a detachable instrumentation module that may be removed from the accessory, enabling calibration and maintenance at a remote facility without need for transporting the entire unit. The module may also house a memory device that may be upgraded with calibration data and firmware during the calibration process.

26 Claims, 6 Drawing Sheets

U.S. PATENT DOCUMENTS

| | | | |
|---|---|---|---|
| 6,733,507 | B2 | 5/2004 | McNicholas et al. |
| 6,813,575 | B2 | 11/2004 | Laflamme |
| 6,820,616 | B1 | 11/2004 | Jordan |
| 6,848,297 | B2 | 2/2005 | Tilley |
| 6,955,170 | B1 | 10/2005 | Mullins et al. |
| 7,140,234 | B2 | 11/2006 | Tilley |
| 7,343,783 | B2 | 3/2008 | Tilley |
| 7,343,917 | B2 | 3/2008 | Jones |
| 7,671,124 | B2 | 3/2010 | Tsujimoto et al. |
| 7,988,452 | B2 * | 8/2011 | Eiwen et al. .......... 434/270 |
| 2002/0116984 | A1 | 8/2002 | Tilley |
| 2003/0126911 | A1 | 7/2003 | Tilley |
| 2005/0223778 | A1 | 10/2005 | Tilley |
| 2007/0062259 | A1 | 3/2007 | Tilley |
| 2007/0088291 | A1 | 4/2007 | Weilbacher |
| 2007/0125164 | A1 | 6/2007 | Zielinski et al. |
| 2008/0064341 | A1 | 3/2008 | Shen et al. |
| 2009/0099286 | A1 | 4/2009 | Park |

OTHER PUBLICATIONS

Hazmat Protective Systems, Ltd., Gas Mask Leakage Tester, (1996), South Africa.

Air Techniques Inc., "TDA-99 Field Mask Leakage Tester," (1986), Maryland.

Air Techniques Inc., "TDA-99D Dual-Purpose Field Mask Leakage Tester," (1996), Virginia.

Air Techniques Inc., "TDA-99M dual-purpose field mask leakage tester," (1998).

Scot Incorporateed, "Scot Communications and Oxygen Tester," (2007), www.scotinc.com.

Scot Incorporateed, "Combined Aircrew Systems Tester," (2007), www.scotinc.com.

Biosystems Posichek, "Posichek3, Details, Overview," (prior to Sep. 2007), www.posichek.com.

Avon Technical Products, "AFT 500 Leak Tester," (1998), United Kingdom.

SP Defense, "BACANOP Leakage Tester for Respirators," (1998), France.

Kloeppner, "Memo re: Serviceability Test, (TSI, Inc.)," (1996), Minnesota.

Johnson et al., "Final Report for period Sep. 1984 to Aug. 1987," (1987), Minnesota.

Air Techniques Int'l, photograph A1 of head form and bladder, manufactured and sold by Air Techniques Int'l, a division of Hamilton Associates, Inc., of Baltimore, MD; device solf prior to Jun. 2008.

Air Techniques Int'l, photograph A2 and A3 of head form and bladder, manufactured and sold by Air Techniques Int'l, a division of Hamilton Associates, Inc., of Baltimore, MD; device solf prior to Jun. 2008.

Application and File History of U.S. Appl. No. 12/826,197, Inventors Carideo et al., filed Jun. 29, 2010.

* cited by examiner

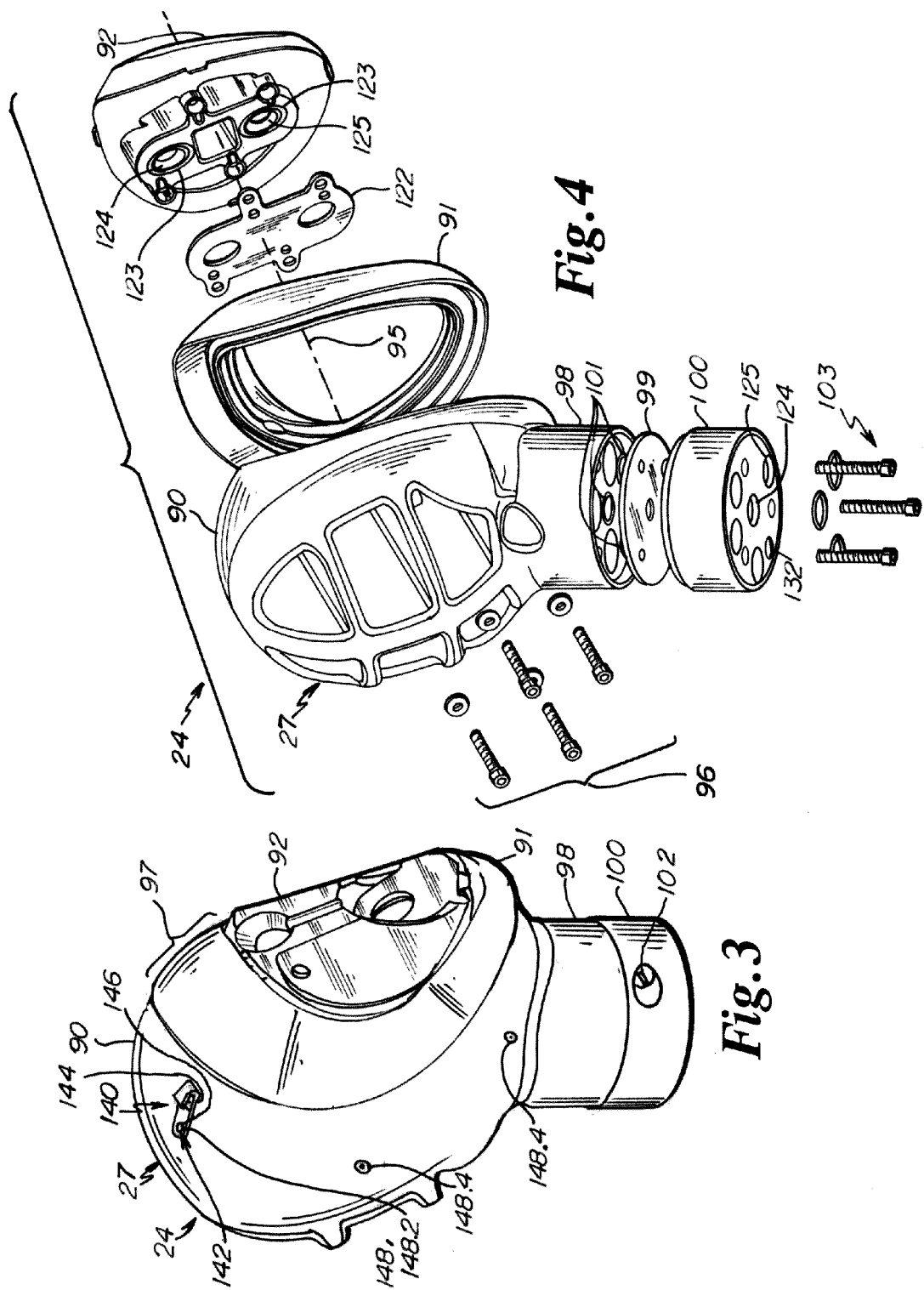

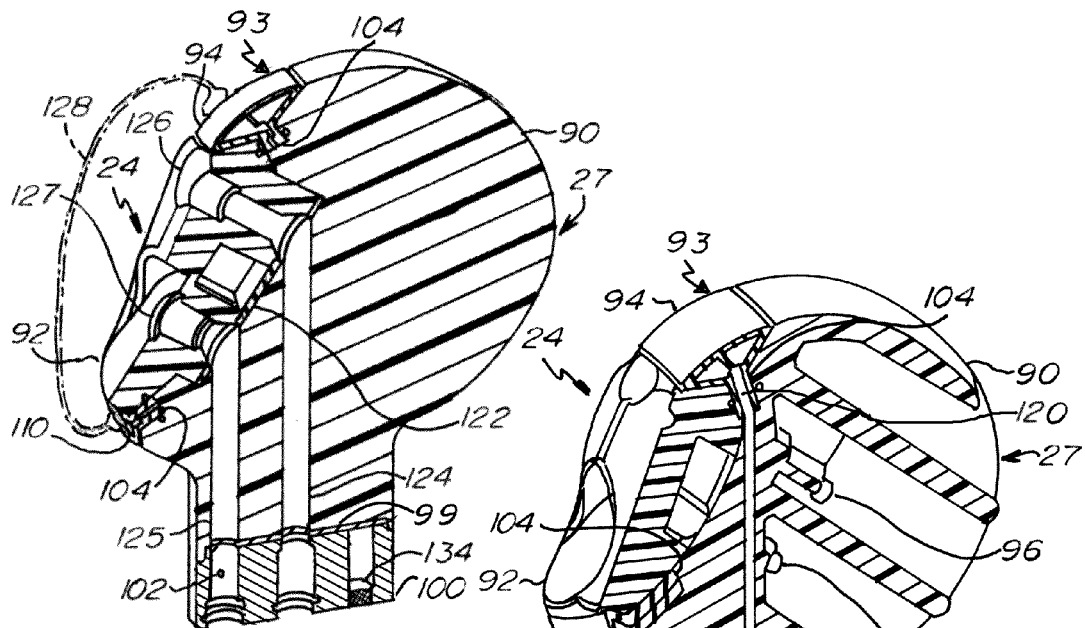
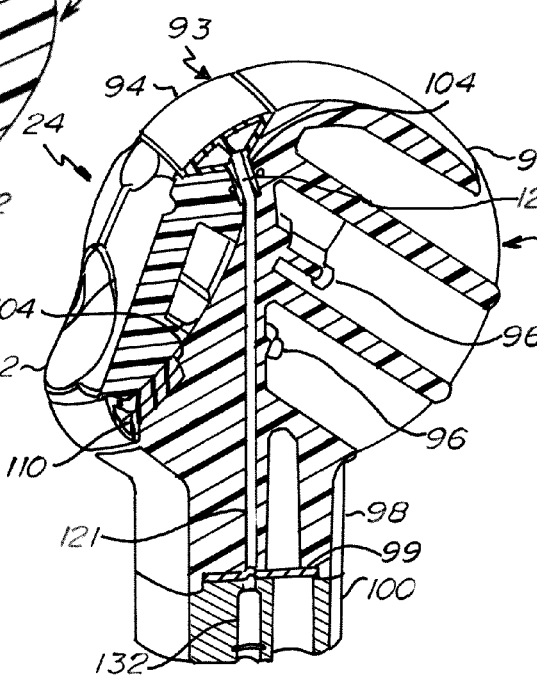
*Fig.6A*
*Fig.5*
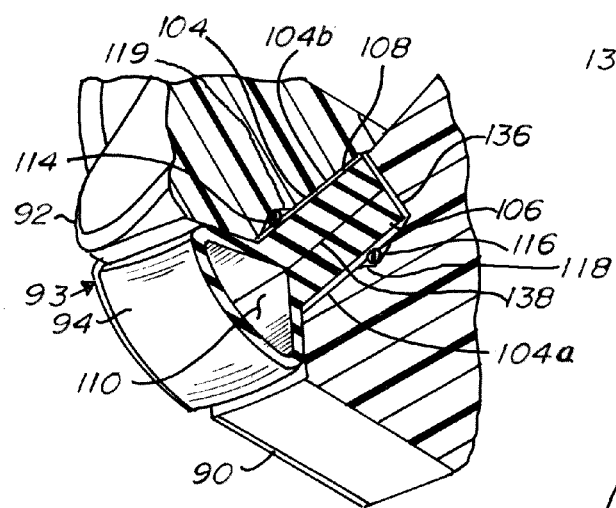
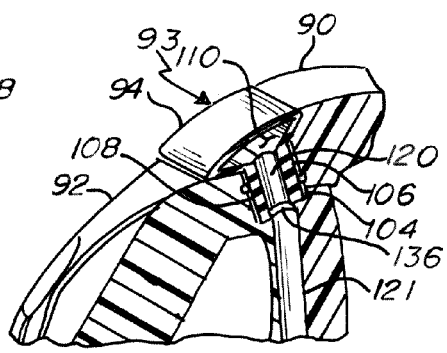
*Fig.5A*
*Fig.5B*

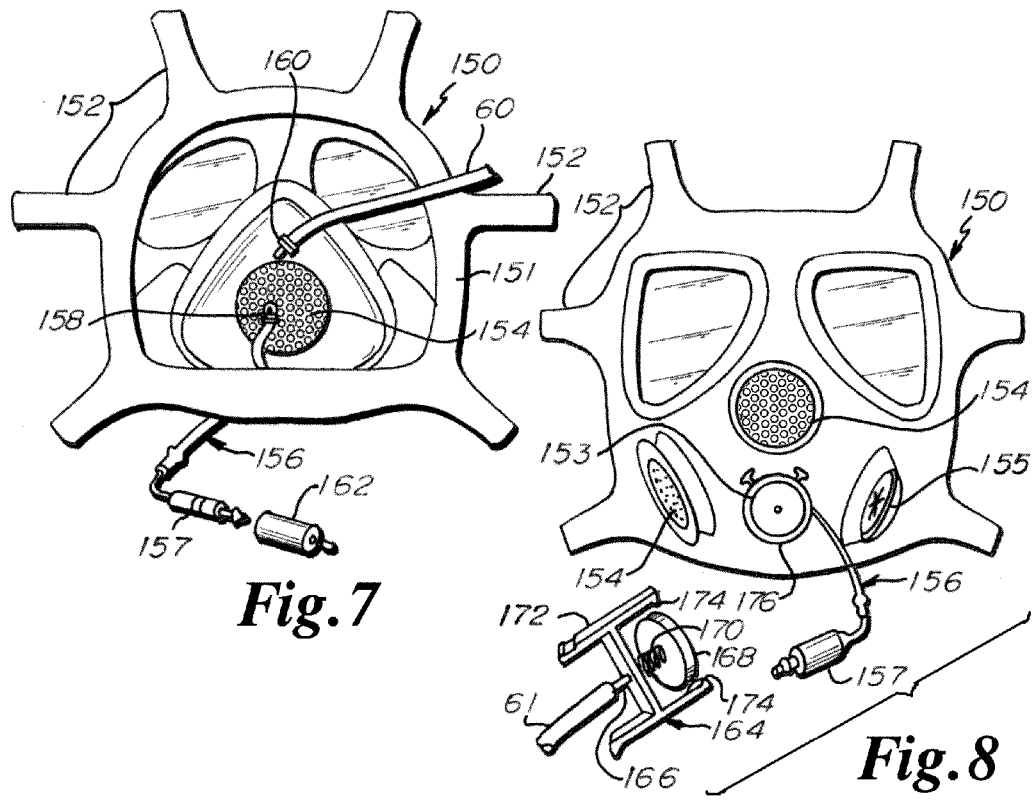
Fig. 7
Fig. 8
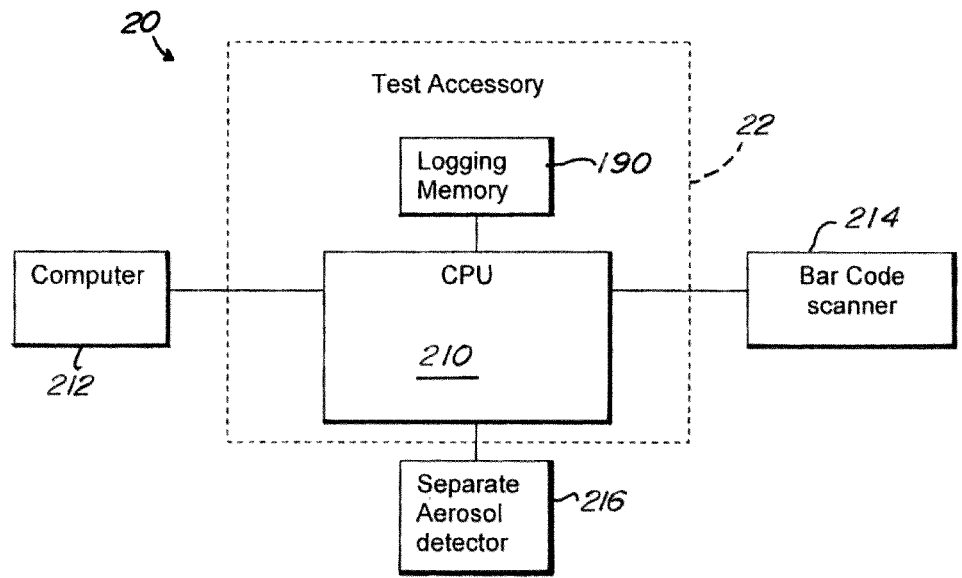
Fig. 10

RESPIRATOR TEST ACCESSORY

RELATED APPLICATIONS

This application claims the benefit of U.S. Patent Application No. 61/075,241, filed Jun. 24, 2008, which is hereby incorporated by reference in its entirety.

FIELD OF THE INVENTION

The present invention is directed to test equipment. More particularly, the present invention relates to test equipment for protective gas masks and respirators.

BACKGROUND OF THE INVENTION

Many organizations that own and use respirators and/or protective masks have a need to periodically test the equipment to confirm their adequate operation. Many such organizations already possess equipment capable of performing certain aspects of a respirator performance test, such as an aerosol detector or a particle counter. The aerosol detectors and particle counters are used in the testing of respirators to "challenge" the fit and integrity of a respirator mask. The challenge test typically includes subjecting the respirator or portions thereof to a fine aerosol and measuring the concentration of particles that penetrate into the respirator. Accordingly, such organizations may prefer to acquire only the accessory equipment ancillary to the aerosol detector/particle counter to reduce procurement costs.

Respirator testing often utilizes a so-called "head form" upon which the respirator is mounted to test the performance. The use of an inflatable member to provide a positive seal against the portion of the respirator mask that seats against the user's face is known. The inflatable member provides a seal regardless of the fit of the mask against the head form. Any leaks detected are then known to be due to leaks in the mask, not leaks in the fit.

U.S. Pat. No. 5,808,182 to Stumpf, the disclosure of which is hereby incorporated by reference herein in its entirety except for terms expressly defined therein, discloses a "covering" that covers a portion of a head form and is inflatable through a port on the head form. The covering of Stumpf comprises a wide, flexible band with transitions areas near the edges of the band that are sealed against the head form. Accordingly, the transition area must be constructed pressure tight to guarantee inflation of the covering. Stumpf does not disclose how these transition areas are to be made pressure tight.

U.S. Pat. No. 7,343,783 to Tilley, which is also hereby incorporated by reference herein in its entirety except for terms expressly defined therein, discloses an "inflatable seal" that is disposed in a recess on a single portion of a head form. Tilley offers no details on the construction of the inflatable seal, nor how the inflatable seal is secured within the recess. However, an embodiment of the Tilley disclosure is commercially available as part of the TDA-99B Respirator Function Tester, marketed by Air Techniques International of Owings Mills, Md., USA. The inflatable seals used in the TDA-99B comprise a seam that is sealed with an adhesive, and also an inlet tube that is inserted through an opening or slit in the inflatable seal and sealed using a patch and adhesive. The adhesives in the inflatable seal of the TDA-99B necessitates additional curing time in the manufacturing of the inflatable seal, and also additional quality assurance steps to check the integrity of the inflatable seal and the inlet tube.

Various components of a respirator test system require periodic calibration and maintenance to assure competent results. Such calibration and maintenance can require removal of the individual sensors, shipping of the test unit, or switching equipment and/or test fixtures to accommodate field calibration that adds to the bulk of the respirator test system.

Organizations involved in the testing of respirators would welcome a respirator test accessory that complements already existing aerosol detection equipment and eases the burdens on equipment and personnel with respect to calibration and maintenance. Manufacturers of such test accessories would welcome an assembly process that reduces the dependence on adhesive seals and the time and quality assurance testing attendant thereto.

BRIEF SUMMARY OF THE INVENTION

Various embodiments of the invention include an accessory that may be implemented with a particle counter for testing the fit and seal integrity of gas masks and respirators. The accessory may also include fixtures and instrumentation for testing other parameters related to mask/respirator performance, such as drink train integrity and exhalation valve seating integrity.

Some embodiments of the invention include an instrumentation module containing instrumentation and/or other appurtenances that may require periodic calibration or periodic maintenance. In these embodiments, the instrumentation module can be removed to a test facility for calibration and checkout, without need for transporting the entire accessory. The instrumentation module may also contain a microprocessor operatively coupled to a memory device such as a flash memory so that the updated calibrations and upgrades to the firmware may be loaded into the instrumentation module at the test facility. The modularity provided by the instrumentation module enables the use of a second or spare instrumentation module to operate the system while a first instrumentation module is in for calibration.

Certain embodiments of the invention may implement a full head form, as opposed to a partial head form or a face form that emulates only the face portion of a user. The full head form enables the testing of a variety of gas masks and respirators by using the mask harness to mount the mask to the head form, thus eliminating the need for special mounting accessories or the need to otherwise alter the mask for testing purposes.

Some embodiments may be configured to augment testing of masks that are not equipped with a harness. For example, in a production setting, it is often desirable to test a mask for leaks before a harness is fitted to the mask. Certain embodiments of the full head form may be configured to accommodate masks that do not have a harness.

The disclosed head form may utilize a separate bladder member or portion that enables testing of the mask integrity apart from the fit integrity. In certain embodiments, the bladder member can be configured to form a bladder in a way that eliminates several steps in the manufacturing process.

Structurally, the head form of the present invention may comprise a front portion and a back portion that compresses the portions of the bladder member therebetween to create the seal during assembly. Thus, formation of the bladder does not require the seam to be sealed before assembly, making the head form easier to manufacture than prior art bladder assemblies. The bladder member may also be configured with a wide registration surface to accommodate a number of sized respirators (e.g. small, medium, large) so that all can be tested on the one size head form. The front and back portions that secures the bladder member to the head assembly may be coupled to each other with conventional fasteners, which enables field replacement of bladders that are damaged or otherwise fail.

Various embodiments of the invention include an accessory for testing the integrity of a respirator mask. The accessory may comprise an instrumentation module including instrumentation for determination of integrity of the respirator mask and a head form adapted to accommodate the respirator mask and detachably coupled with the instrumentation module. The system may include a casement for housing the accessory. The instrumentation module may also include an operator interface. The instrumentation module as well as the head form may be configured for detachable mounting to the casement. The accessory may further include an aerosol generator to augment challenge testing of respirator masks.

Within various embodiments of the invention, a head form for respirator testing includes a face portion and a base portion that cooperate to approximate the shape of a human head. The face portion and the base portion may cooperate to define a continuous recess about the face portion. A bladder member defining an inflatable bladder having an interior chamber may be disposed in the continuous recess, a portion of the bladder being compressed between the face and the base portions to secure the bladder member to the head form. Optionally, the head form may further comprise an adhesive disposed proximate the continuous recess and between portions of the bladder member. The portion of the bladder member compressed between the face portion and the base portion of the head form may include first and second flange portions that are compressed together to define the inflatable bladder and interior chamber. The flange portions may also cooperate to form an inlet to the interior chamber of the inflatable bladder. The head form may also include an inlet in fluid communication with a passageway that passes through the head form, the passageway being capable of connection with a pressure source for inflation of the bladder. The head form may also cooperate with the bladder member to define a plenum between the passageway and the inlet to the interior chamber of the inflatable bladder.

Optionally, the head form can include structure for the mounting of clips for mounting a mask to the head form without the use of the harness. Such structure may include snaps, slots and/or fasteners that accommodate the mounting of a clip. An extension device such as a strap may be included for adjustment of the clip position relative to the bladder to accommodate masks of different size.

The present invention may also be configured to interface with the internal portion of the drink tube assembly, and be programmed to perform a drink tube flow test. In this embodiment, standard drink tube adaptors, each specific to a type of respirator being tested, can be readily connected to the drink tube canister connection. In many instances, the drink tube adaptors are available from existing quantitative fit test systems. The interchangeability of the various drink tube adaptors allows a greater variety of respirators to be tested without changing the adaptor permanently attached to the test system.

Various embodiments of the invention may include a bar code scanner for rapid reading of bar code information (e.g. respirator serial numbers, test date, test operator, test conditions) of a specific respirator for review on the accessory itself or for downloading to a computer for processing or documentation purposes.

BRIEF DESCRIPTION OF THE DRAWINGS

FIG. 3 is a perspective view of the head form assembly in isolation in an embodiment of the invention;

FIG. 4 is an exploded view of the head form assembly of FIG. 3;

FIG. 5 is a sectional view of a head form assembly in an embodiment of the invention;

FIG. 5A is an enlarged partial sectional view depicting a bladder member forming an inflatable bladder on the head form assembly of FIG. 5;

FIG. 5B is an enlarged partial sectional view depicting an inlet to the interior chamber of the bladder of the head form assembly of FIG. 5;

FIG. 6A is a sectional view of a head form assembly in an embodiment of the invention;

FIG. 7 is a rear elevation view of a respirator assembly, depicting connection of pneumatic lines for testing of a drink train in an embodiment of the invention;

FIG. 8 is a frontal elevation view of the respirator assembly of FIG. 7, depicting a connector for testing of an exhalation valve in an embodiment of the invention;

FIG. 10 is a control block diagram for a respirator test system in an embodiment of the invention.

DETAILED DESCRIPTION OF VARIOUS EMBODIMENTS

Figure 1:
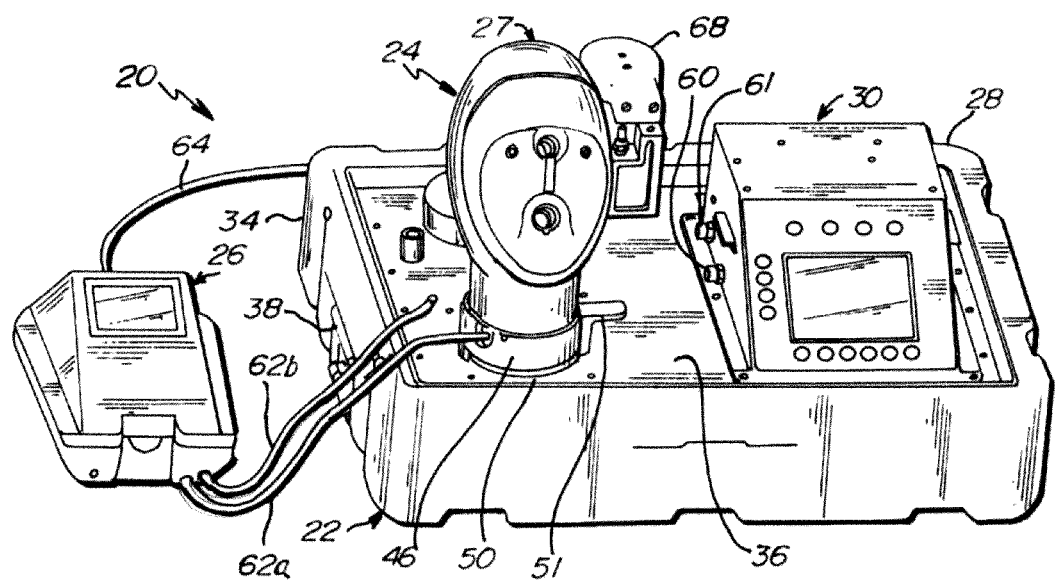
FIG. 1 is a perspective view of a head form test accessory in combination with a particle counter in an embodiment of the invention.
Figure 2:
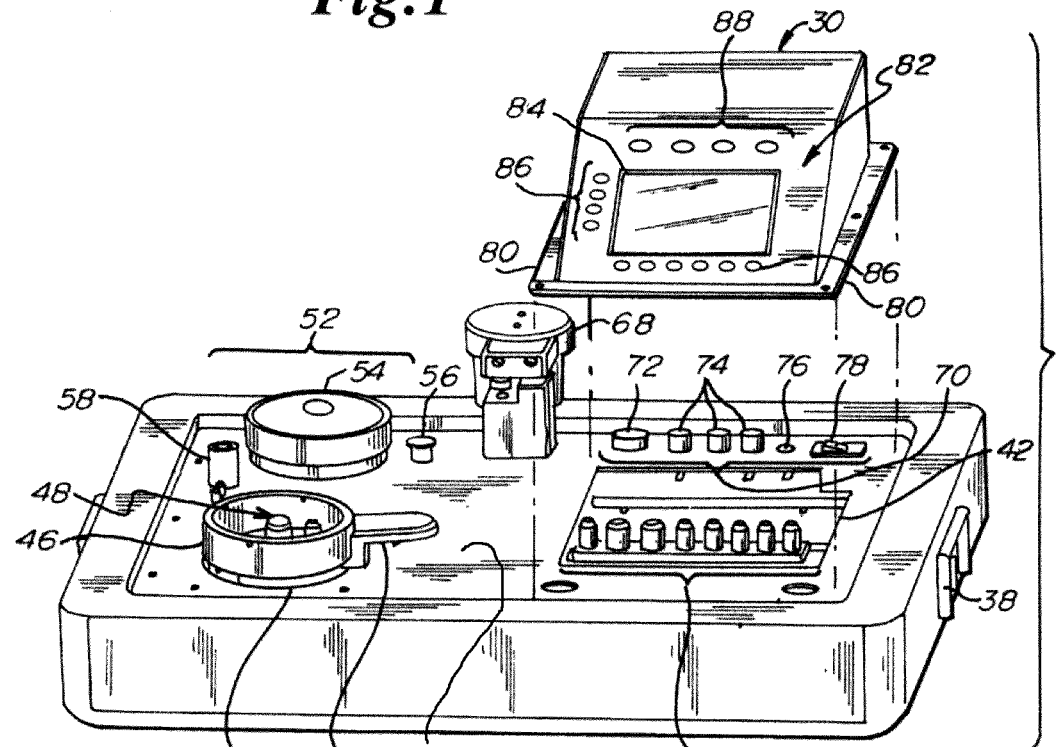
FIG. 2 is perspective view of the test accessory of FIG. 1 without the head form and depicting removal of the instrumentation module.

Referring to FIGS. 1 and 2, a respirator testing system 20 including a test accessory 22, a head form assembly 24 and a particle counter 26 is depicted in an embodiment of the invention. In one embodiment, the head form assembly includes a head form 27 having an outer contour that approximates the shape of a full human head. The accessory 22 includes a casement 28 and an instrumentation module 30. In the depicted embodiment, the casement 28 includes a chassis 34 that supports a console 36 and with handles 38 operatively coupled thereto. The console 36 may define an opening that serves as a portal 42 between the instrumentation module 30 and various instrumentation interface connectors 44 in the interior of the casement 28.

The console 36 may include a mounting collar 46 for operative coupling to the head form assembly 24 and for guiding the head form assembly 24 for easy coupling of the head form assembly 24 to various head form instrumentation couplings 48 that extend into the casement 28. The mounting collar 46 may include a base 50 and an actuation lever 51. The head form instrumentation couplings 48 may be of a variety of forms, including pneumatic and/or electrical, and may be in communication with various components of the respirator testing system 20 such as the instrumentation module 30 and the particle counter 26.

The mounting collar 46 may include a magnetic coupling/decoupling feature. The base 50 may be configured to rotate about a central axis normal thereto with magnets (not depicted) disposed in the base 50. The magnets may be arranged to substantially align with magnets in the head form assembly 24 (e.g., numerical reference 134 of FIG. 6A). The magnets of the head form assembly 24 may be oriented so that they are attracted to the magnets disposed in the base 50 when the actuation lever 51 is in a locked position. Alternatively, or in addition, one or more magnets 134 may be disposed in the base 50 and oriented to repel the magnets 134 in the head form assembly 24 when the actuation lever 51 is in an unlocked position.

The casement 28 may further include a variety of air flow components 52 and controls that may be mounted to or otherwise accessible from the console 36, including an air intake filter 54, an air flow control valve 56 and a blower exhaust 58. The air flow components 52 may also comprise a drink train testing line 60 and/or an exhaust valve testing line 61, which in FIGS. 1 and 2 are operatively connected to the interface module 30, but may instead extend from the console 36 or other points on the casement 28.

An aerosol generator 68 may also be operatively coupled to the casement 28 or console 36, and may extend through the console 36 for accessibility. In one embodiment, a tent or cover (not depicted) is placed over the head form assembly 24. The interior of the tent can be in fluid communication with the output of the aerosol generator to create a high concentration aerosol environment about the head form assembly. When a tent is utilized, the free end of the sampling line 62b is located within the tent proximate the head form assembly 24. The aerosol generator 68 can also be operatively coupled to a sprayer (not depicted) for generation of a challenge aerosol for localization of leaks.

The particle counter 26 may be a stand alone unit such as the PORTACOUNT PLUS, manufactured by TSI, Incorporated of Shoreview, Minn., USA, assignee to the instant application. In one embodiment, the particle counter 26 is connected to two aerosol sampling lines 62a and 62b and to an instrumentation cable 64. The aerosol sampling line 62a may terminate at the head form, and the aerosol sampling line 62b may terminate at the ambient atmosphere proximate the head form. The instrumentation cable may include power and/or instrument signal lines such as an RS-232 cable that connect to the casement 28.

A variety of electrical controls and components 70 may also be accessible from the console 36, such as an electrical source connector 72, various fuses 74, a power "on" indicator light 76 and an on/off switch 78.

In one embodiment, the instrumentation module 30 is configured for quick connection/disconnection from the pneumatic interface connectors 44. The pneumatic interface connectors 44 connect various pneumatic lines routed through the casement 28 to appropriate instrumentation and components in the instrumentation module 30. (See discussion below attendant FIG. 9 for additional details.) The pneumatic interface connectors 44 may be of a bulkhead type fitting that do not require manipulation of a locking mechanism on the connector itself. The pneumatic interface connectors 44 may be sealed by O-rings (not depicted) that are engaged between the pneumatic interface connectors 44 and the structures that define the corresponding mating ports (not depicted) within the instrumentation interface module 30.

The instrumentation module 30 may further include electrical connections (not depicted) such as ribbon cables or pig tails with appropriate connectors in the casement 28 and/or the instrumentation module. Example connectors include Type 120A-A-111 screw terminal wire connector mating with a 120-M/121 board mounted connector, manufactured by WECO Electrical Connectors, Inc. of Quebec, Canada.

The instrumentation module 30 may include flanges 80 that register against and are secured to the console 36. The instrumentation module 30 may further include an operator interface 82 having a display screen 84 and various function actuators 86 and indicator lights 88.

In operation, the electrical cabling (not depicted) is operatively coupled between the instrumentation interface module 30 and the components within the casement 28. The instrumentation module 30 may be placed over the portal 42 so that mating ports (not depicted) within the instrumentation module 30 are aligned with pneumatic interface connectors 44. The pneumatic interface connectors 44 may include tapered distal end portions that serve to guide the pneumatic connectors into corresponding mating ports within the instrumentation module 30. Alternatively, or in addition, dowels (not depicted) may be provided on the console 36 adjacent the portal 42 that align with holes in the flanges 80 to aid in the alignment. The flanges 80 are brought into contact with the console 36 and secured in place by fasteners such as conventional screws, wing nuts, spring loaded twist locks, or other quick release fasteners. By securing the instrumentation module 30 to the console 36, the various pneumatic interface connectors 44 may be secured in positive connection with the components within the instrumentation module 30. To detach the instrumentation module 30, the flange 80 is decoupled from the console 36 and the module 30 lifted away from the console 36 for disconnection of the module 30 with the pneumatic interface connectors 44.

The system may be arranged so that various instruments and components requiring periodic calibration and maintenance are contained in the instrumentation module 30. Accordingly, only the instrumentation module 30, and not the entire casement 28, is required for calibration and maintenance. Also, for scenarios where the instrumentation module is sent to a remote location for calibration and maintenance, the rest of the accessory 22 need not be removed from the field. In fact, a spare or "roving" replacement module may be utilized to keep the accessory 22 operational while the instrumentation module 30 is out of service.

Instructions that direct field personnel in the removal of the instrumentation module 30 and the installation of a replacement module such as outlined above could be provided on a tangible medium that accompanies the unit. The "tangible medium" may comprise a computer readable medium such as a CD, flash memory or a hard disk. In another embodiment, the tangible medium could reside on a remote computer accessible over the internet. In one embodiment, the tangible medium comprises an instruction sheet that accompanies the respirator testing system 20 or stickers that are posted on the respirator testing system 20.

Referring to FIGS. 3 through 5B, the head form assembly 24 used in the respirator testing system 20 is depicted in an embodiment of the invention. The head form assembly 24, which may be shaped generally in the form of a human head, may comprise a base portion 90, a face portion 92 and a bladder member 93 that forms an inflatable bladder 94, all held together by fasteners 96. The inflatable bladder 94 may be configured to provide a wide registration surface 97. The base portion 90 may include a neck portion 98 that extends to a base ring 100. In one embodiment, a sampling port 102 is located in the base ring for interfacing with the sampling line 62a of the particle counter 26. In one embodiment, the bladder member 93 comprises a cast soft urethane or an injection molded silicon.

Functionally, providing the head form assembly 24 in combination with the inflatable bladder 94 enables the testing of respirator masks of various types and sizes. The masks may be strapped to the head form assembly 24 in the same manner as they would be to a human head, without need for accessories to accomplish the coupling. The sealing interface of the mask is seated against the registration surface 97 of the inflatable bladder 94. The inflatable bladder 94 may then be inflated to provide a seal of high integrity between the head form assembly 24 and the mask. The width of the registration surface 97 may be sized large enough to accommodate respirator masks of different sized sealing interface openings. Also, the neck portion 98 of the head form assembly 24 enables testing of respirators that seal around the neck of the user—again without need for special accessories—something a partial head form or a face form may not enable.

The base and face portions 90 and 92 may cooperate to define a continuous interface therebetween. In one embodiment, the continuous interface defines a continuous recess 104. The bladder member 93 may include continuous flange portions 106 and 108 that are captured in the recess 104 upon assembly of the base and face portions 90 and 92 to compress the flange portions 106, 108 together, forming an air tight seal and defining an inflatable interior chamber 110. The base and face portions 90 and 92 may include continuous grooves 118 and 119, respectively, that interface the flange portions 106 and 108, respectively (FIG. 5A). O-rings 114 and 116 may be disposed in the grooves 118 and 119, respectively to provide an added measure of sealing integrity between the interior of the head form assembly 24 and the ambient environment.

Alternatively, the O-ring/groove arrangement may be reversed so that one or both of the grooves are formed on the flange portions 106, 108 for seating of the O-rings 114, 116 (not depicted). In yet another alternative, the flange portions 106, 108 may be formed with detents (not depicted) that cooperate with grooves 118 and/or 119 formed in the base portion 90 and face portion 92, respectively, to not only provide sealing integrity of the inflatable bladder 94 but also to secure the bladder member 93 within the recess 104.

The flange portions 106 and 108 may also cooperate to form an inlet 120 therebetween (FIG. 5B). The inlet 120 may be in fluid communication with a passage 121 formed, for example, in the base portion 90. Alternatively, one or both of the flange portions 106, 108 may have one or more passages extending through the flange portion 106 or 108 and in fluid communication with the inflatable interior chamber 110 and located proximate the passage 121 (not depicted). In one embodiment, the passage 121 extends from proximate the inlet 120 to the base ring 100. The base ring 100 may include a coupling 132 for connection of the passage 121 to a pressure source and magnets 134 that magnetically couple the magnets in the mounting collar 46. In one embodiment, the passage 121 is not directly coupled to the inlet 120; rather, fluid communication between the passage 121 and the inlet 120 is augmented by a gap or plenum 136 between the flange portions 106, 108 and the base portion 90. The fasteners 96 may implement features that that provide leak tight coupling, such as grommets or O-rings at the shoulders of the fasteners, plyable fastener material, threads doped with sealant or sealing tape, or a combination thereof.

Functionally, the air tight assembly of the head form assembly 24 avoids a requirement that the plenum 136 be air tight. In this embodiment, gas that is pressurized within the plenum 136 may leak between the interface of the base portion 90 and the face portion 92, but does not depressurize the plenum 136 or, subsequently, the inflatable bladder 94, because the interior of the head form assembly 24 may be maintained substantially at the inflation pressure of the inflatable bladder 94.

Alternatively, or in addition, a gasket 122 (FIG. 4) or other appropriate seal may be disposed between the interface of the base and face portions 90 and 92, effectively making the plenum 136 air tight. The gasket 122 can also be adapted to seal various passageways that pass between the face and base portions 90 and 92.

The base and face portions 90 and 92 of the head form 27 may be formed of a resin such as epoxy, urethane or a high density plastic, and may be formed by process of pour or injection molding. The base ring 100 may be constructed of a metal such as aluminum or stainless steel for precision forming of coupling interfaces therein. Anchors (not depicted) may extend into the head form 27 to provide a way of fastening the base ring 100 to the neck portion 98. Alternatively, fastener anchors (not depicted) may be disposed in the neck portion for use of fasteners to couple the base ring 100 to the neck portion 98. A gasket 99 may also be disposed between the base ring 100 and the neck portion 98 to prevent leakage radially outward at the interface of the base ring 100 and neck portion 98.

In assembly, the bladder member 93 may be positioned on the base portion 90 with the inlet 120 substantially aligned with the passage 121. The face portion 92 may then placed over the base portion 90 and bladder member 93 sub-assembly and secured to the base portion with the fasteners 96. The base portion 90, face portion 92 and flanges 106, 108 may be dimensioned such that the act of fastening the face portion 92 to the base portion 90 causes a compression of the flange portions 106 and 108 together to form a seal 138 therebetween, as well as between the flanges 106, 108 and the base and face portions 90 and 92, respectively. In one embodiment, the seal 138 is formed without use of adhesives or binders; that is, the flanges 106, 108 provide a "dry seal" between each other and with the base and face portions 90 and 92. In other embodiments, an adhesive may be disposed between flanges 106 and 108, and/or between the flanges 106, 108 and the recess 104.

An advantage of the above disclosed methods of assembly is that cure time for an adhesive does not delay or extend manufacturing or assembly time. When dry seals are implemented, there is no cure time because there is no adhesive. The inflatable bladder 94 may be formed without a separate sealing operation between the mating surfaces before installation on the head form assembly 24. When adhesives are implemented, the adhesives are not relied upon for structural purposes; that is, the head form 27 provides structure that holds the components in place while the adhesive(s) cures, so that the head form assembly 24 may proceed through any remaining steps of manufacturing or packaging without delay.

Another advantage of various embodiments disclosed is that there is no need to undergo separate manufacturing steps to enable access of pressurized gas into the inflatable bladder 94. In one embodiment, rough alignment between the inlet 120 and the passage 121 enables charging of the inflatable interior chamber 110, without need for insertion of tubing into the inflatable bladder 94 and without the use of adhesives to provide a seal between the tubing and the inflatable bladder 94. In certain embodiments, the plenum 136 may also be sized so that pressurized gas entering the passage 121 will find its way into the inflatable interior chamber 110 without need for any alignment of the inlet 120 with the passage 121.

Referring to FIG. 6A, a sectional view of the head form assembly 24 is depicted in an embodiment of the invention. An inlet passage 124 and an outlet passage 125 each pass through the face and base portions 92 and 90, terminating at inlet and outlet ports 126 and 127, respectively. A mask or respirator 128, depicted in phantom, is mounted to the head form assembly 24 and in contact with the inflatable bladder 94 to form a closed circuit between the inlet and outlet passages 124 and 125.

Representative and non-limiting examples of the flow rate and the vacuum caused thereby is approximately 16 liters per minute (lpm) and—6 inches of water column (in. wc). In one embodiment, the flow rate is set or controlled to within ±½ lpm of the 16 lpm flow rate, and the vacuum to within ±½ in. wc of the—6 in. wc vacuum. In another embodiment, a representative and non-limiting flow rate is 14 lpm or higher, and a vacuum of—5 in. wc or greater. Matching the desired flow rate and vacuum is discussed further in connection with FIG. 9.

In operation, a flow of air can be initiated through the inlet passage 124 which passes through the mask 128 and out the outlet passage 125. The velocity of the air flow can cause a drop in the static pressure of the closed circuit, thus creating a vacuum relative to the ambient atmosphere. If there are leaks in the mask 128, airborne particles that are proximate the leak are drawn into the mask and exit the head form assembly 24 via the outlet passage 125. In one embodiment, the particle counter 26 draws samples from the outlet passage 125 via sampling line 62a, which is plumbed to the sampling port 102 to measure the concentration of particles passing through the outlet passage 125. A sample is also drawn via sampling line 62b to determine the concentration of ambient particles external to but proximate the head form assembly 24. In this embodiment, the ratio of the ambient concentration to the concentration of particles in the outlet passage 125 is the fit factor.

Figure 6B:
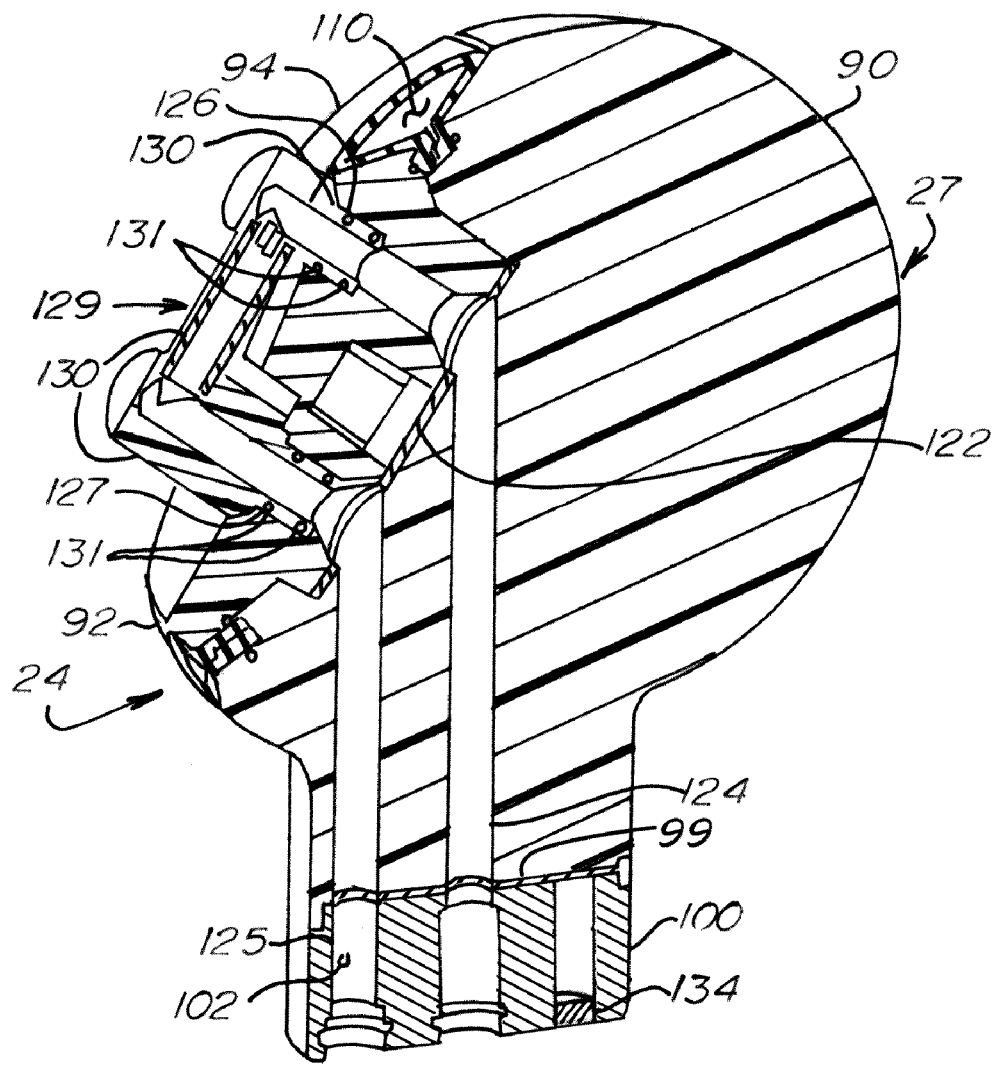
FIG. 6B depicts the head form assembly of FIG. 6A with an adaptor fitting for testing the integrity of the head form assembly.

Referring to FIG. 6B, the head form assembly 24 is depicted with an adaptor 129 for testing the integrity of the respirator testing system 20 in an embodiment of the invention. In this embodiment, the adaptor 129 comprises tubing sections 130 that cooperate with the inlet and outlet ports 126 and 127 to form a closed circuit between the inlet and outlet passages 124 and 125. Seals 131 such as O-rings may be located near the ends of the adaptor to provide an air-tight coupling between the adaptor 129 and the inlet and outlet ports 126, 127.

Other configurations can be adapted to serve the function of the adaptor 129. For example, instead of the inlet and outlet ports 126 and 127 being female, they could be configured as a male structure, i.e. as a port fitted with a stub that accommodates a compression fitting, or as a hose barb that accommodates a flexible tubing. Other structures for accomplishing a closed circuit between the inlet and outlet passages 124, 125 are apparent to the artisan.

Functionally, the closed circuit created by the adaptor 129 enables the testing of the integrity of the head form assembly 24. The low static pressure that causes a vacuum in the mask 128 of FIG. 6A is generally present throughout the closed circuit. Accordingly, any leaks between the closed circuit (head form assembly 24 and various lines and fixtures that convey the air flow thereto) will tend to draw ambient particles into the circuit, which can result in an erroneously low fit factor indication. The adaptor 129 generally isolates the circuit to detect such leaks.

In one embodiment, the head form assembly 24 may be equipped with a plurality of clip assemblies 140, each comprising a fastening mechanism 142 and a clip 144 (FIG. 3) Optionally, an adjustable extension 146 such as a strap is provided between the fastening mechanism 142 and the clip 144. The fastening mechanism 142 may comprise a snap 148 having a socket portion 148.2 that cooperates with a stud portion 148.4 mounted on the head form assembly 24 to secure the clip assembly 140 to the head form assembly 24. Alternatively, the clip assemblies 140 may be attached to the head form assembly 24 using a standard fastener that couples with a threaded member that is moored in the head form 27 of the head form assembly 24. In another embodiment, slots may be configured to mate with the fastening mechanism 142 to secure the clip assembly 140

(Note: FIG. 3 depicts only one clip assembly 140 mounted thereto, with stud portions 148.4 depicted for two other clip assemblies 140.)

Functionally, the clip assemblies 140 can be attached to the head form assembly 24 when it is desired to test a mask that is not fitted with a harness. The adjustable extensions 146 can be set to a desired length that applies a radial tension on the mask to secures the mask firmly against the inflatable bladder 94. The clip assemblies may be detached from the head form assembly 24 when not in use.

Referring to FIGS. 7 and 8, appurtenances and methods related to the drink train and exhaust valve testing lines 60 and 61 are described and depicted in an embodiment of the invention. A respirator mask 150 is depicted having a face seal surface 151, attachment straps 152, an exhaust outlet valve 153, voicemitters 154 and a filter port 155. The respirator mask 150 in the depictions also includes a drink train 156 including a quick disconnect fitting 157 on a proximate end and a mouth piece 158 on a distal end.

In FIG. 7, the drink train testing line 60 is depicted as having a fitting 160 operatively coupled to the distal end. The fitting 160 may be sized to provide an air tight seal when it is coupled with the mouth piece 158. A variety of fittings may serve the purpose of the fitting 160, because mouth pieces for drink trains tend to be flexible and may conform to the contour of the fitting 160. For example, a LUER adaptor of appropriate size may be used. A drink canister adaptor 162 may also be provided that engages with the quick disconnect fitting 157.

In operation, the fitting 160 is inserted into and seated within the mouth piece 158 to provide a temporary seal. To test the drink train 156 for leaks, the drink train testing line 60 can be pressurized or drawn to a vacuum with the quick disconnect fitting 157 in a closed position, and the pressure monitored to detect whether there is a decay in the pressure or vacuum. To test the drink train 156 for obstructions, the drink canister adaptor 162 is coupled to the quick disconnect fitting 157 to open the quick disconnect fitting 157. Pressure decays and flow rates for these respective tests may be measured with instrumentation within the casement 28 that are operatively coupled to the drink train testing line 60.

An advantage provided by this configuration is that the accessory 22 does not have to be altered to accommodate different mask types. Various drink canister adaptors 162 are readily available as the replacement parts for the drink canisters and are implemented independent of the accessory 22.

In FIG. 8, an outlet valve adaptor 164 is depicted as being attached to a distal end of the exhaust valve testing line 61 in an embodiment of the invention. In the depicted embodiment, the outlet valve adaptor 164 includes a central tube 166, plunger portion 168 and a biasing spring 170 operatively coupled with an H-bracket 172. The H-bracket 172 may be formed of a resilient material such as a high density plastic and include detents 174 at the distal end. A seal member (not depicted) such as an O-ring or gasket may be disposed on the distal face of the plunger portion 168.

In operation, the plunger portion 168 is pressed against the outer surface of the exhaust outlet valve 153 and the H-bracket 172 advanced until the detents 174 engage with an outer perimeter 176 of the exhaust outlet valve 153. The biasing spring 170 is thereby compressed between the plunger portion 168 and the H-bracket 172 to provide an active force that keeps the seal member in sealing engagement with the exhaust outlet valve 153. The resiliency of the H-bracket 172 may enable an operator to flex the legs of the H-bracket 172 outward to pass over the outer perimeter 176 of the exhaust valve and to exert a clamping force on the outer perimeter 176 to hold the plunger portion 168 over the exhaust valve outlet 153. By this arrangement, the outlet valve adaptor 164 can accommodate a range exhaust outlet valves sizes. Also, outlet valve adaptors having plunger portions and H-brackets of various sizes and dimensions may be provided to accommodate a wide range of exhaust outlet valves. These outlet valve adaptors may be readily coupled/decoupled from the exhaust valve testing line 61 without need for altering the accessory 22.

Figure 9:
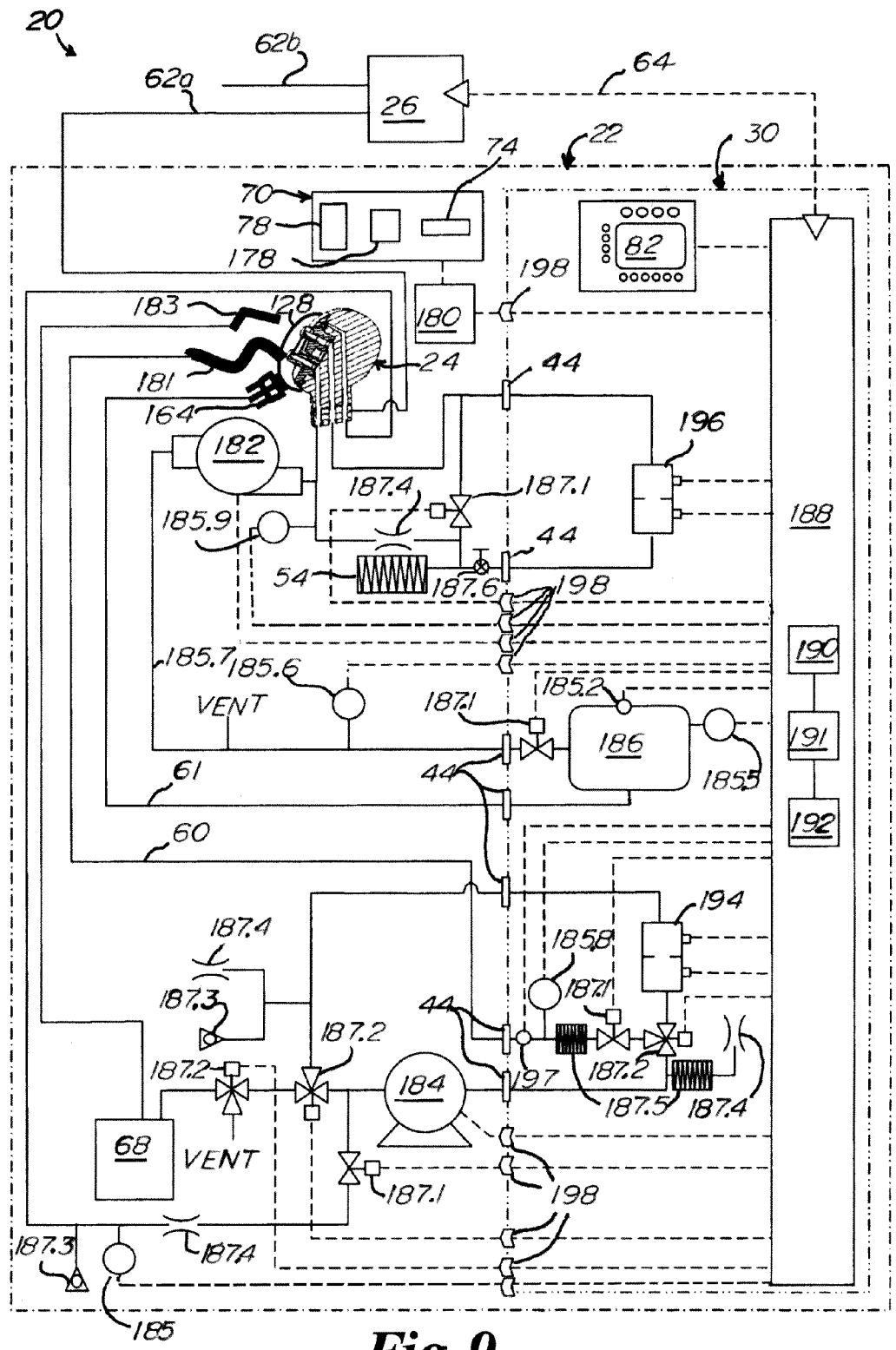
FIG. 9 is a schematic of a head form test accessory in combination with a particle counter in an embodiment of the invention.

Referring to FIG. 9, a schematic of the respirator testing system 20 is depicted in an embodiment of the invention. The schematic depicts the various components of an embodiment of the invention, with the accessory 22 and the instrumentation module 30 bounded by phantom lines. Electrical lines (power, signal and computer) are depicted with dashed lines, while pneumatic lines are depicted with solid lines.

A low voltage, DC power supply 178 and a main power supply 180 may supply power to the various components of the respirator testing system 20. In one embodiment, a blower 182 is used for driving air through the inlet and outlet passages 124, 125 for drawing a vacuum within the breathing chamber of the mask 128 to test the mask integrity. In one embodiment, a diaphragm pump 184 can be utilized for operation of the aerosol generator 68, testing of a drink tube and/or drink train 181, and for inflating the inflatable bladder 94. The aerosol generator 68 may be operatively coupled to a sprayer 183 to assist the operator in localizing leaks in the mask or the mask seal.

A pressure sensor 185 may be utilized to measure the inflation pressure for the inflatable bladder 94. Example and non-limiting inflation pressures for the inflatable bladder 94 may be greater than 3 psi. In one embodiment, the inflation pressure is nominally 6 psi. In another embodiment, the inflation pressure is less than 8 psi.

A testing volume 186 instrumented with a temperature sensor 185.2 and a pressure sensor 185.5 may be provided to augment a pressure decay measurement of the leak rate of mask exhalation valves. In one embodiment, a pressure sensor 185.6 is tapped into a blower line 185.7 that runs between the blower 182 and the testing volume 186 and may be used to measure barometric pressure when the blower is not operating.

A pressure sensor 185.8 may be tapped into the drink train testing line 60 for measuring the operating pressure during testing of the drink train. The pressure sensor 185.8 can be used to determine a pressure decay rate for leak detection in the drink train 181, and can also be used to establish the pressure drop through the drink train 181 when a constant flow rate is established through the drink train 181.

Another pressure sensor 185.9 may be used to determine the vacuum level in the outlet passage 125, which effectively measures the vacuum in the mask 128.

Control of the fluid flow may be provided various and sundry solenoid-operated isolation valves 187.1 and 3-way valves 187.2, check valves 187.3, restriction orifices 187.4, filters 187.5 and a needle valve 187.6. In one embodiment, the needle valve is used to set the vacuum level as measured by pressure sensor 185.5 while the instrumentation module 30 controls the flow rate through the mask as measured at a desired level.

The schematic of FIG. 9 also depicts example components that may be contained in the instrumentation module 30 as bounded by the dashed line. In one embodiment, a computer board 188 includes a microprocessor 191 operatively coupled with memory devices that include a logging memory 190 and a flash memory 192. In the embodiment depicted in FIG. 9, the instrumentation module 30 further includes a first orifice flow meter 194 for measuring the flow rate through the diaphragm pump 182 for the drink tube and drink train tests and a second orifice flow meter 196 for measuring the flow rate for the mask test, and various temperature sensors (e.g., 185, 197) and valving (e.g., 187.1, 187.2) for execution of the various tests. The low voltage power supply 178 can be divided down to provide prescribed voltage levels (e.g. 3.3V, 5V, 12V, both fixed and variable) to various components.

The instrumentation module 30 is depicted in the schematic of FIG. 9 as interfacing with the appurtenances outside the instrumentation module 30 via pneumatic connectors (e.g., pneumatic interface connectors 44) and electrical connectors 198. The electrical connectors 198 may be provided by a ribbon cable and connector that extends out of the portal 42 when the instrumentation module 30 is removed for ready connection/disconnection. Other electrical connecting arrangements, such as sliding or surface contacts, can be implemented that establish connection upon placement of the instrumentation module over the portal 42.

Referring to FIG. 10, a general block diagram of the respirator testing system 20 is depicted in an embodiment of the invention. The test accessory 22 is depicted as having a central processor unit (CPU) 210 that accesses the logging memory 190. The CPU 210 may also communicate with a remote computer 212 and a bar code scanner 214, as well as an aerosol detector 216 (e.g. the particle counter 26).

Functionally, the bar code scanner 214 enables scanning of the serial numbers of newer respirators as well as other bar coded information. The CPU can store the information about the mask and the test parameters locally in the logging memory 190, and/or transfer the information to the remote computer 212 for documentation or further analysis.

The foregoing descriptions present numerous specific details that provide a thorough understanding of various embodiments of the present invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention, which is defined solely by the claims that follow.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

What is claimed is:

1. A head form assembly for respirator testing, comprising:
   a face portion;
   a base portion that cooperates with said face portion, said face portion and said base portion cooperating to define a recess that surrounds said face portion;
   a bladder member disposed in said recess, a portion of said bladder member being compressed between said face portion and said base portion to secure said bladder member within said recess, said bladder member forming an inflatable bladder defining an interior chamber, said bladder member including first and second flange portions that are compressed between said face portion and said base portion to define said interior chamber, said flange portions cooperating to define an inlet to said interior chamber.

2. The head form assembly of claim 1, further comprising an adhesive disposed proximate said recess and between portions of said bladder member.

3. The head form assembly of claim 1 further defining a passageway that passes into said head form assembly, said passageway being in fluid communication with said inlet, said passageway being adapted for connection with a pressure source for inflation of said inflatable bladder.

4. The head form assembly of claim 3 wherein a plenum is defined between said passageway and said inlet to said interior chamber.

5. The head form assembly of claim 1 further comprising a plurality of clips adapted to secure a mask to the base portion.

6. The head form assembly of claim 1 wherein said head form assembly approximates the full shape of a human head.

7. The head form assembly of claim 1 wherein said base portion includes a neck portion adapted to test respirators that seal around said neck portion.

8. The head form assembly of claim 1 further comprising an adaptor adapted establish a flow circuit through said head form assembly for detection of leaks in said head form assembly.

9. The head form assembly of claim 1 wherein said recess is continuous.

10. A head form assembly for respirator testing, comprising:
   a face portion;
   a base portion that cooperates with said face portion, said face portion and said base portion cooperating to define a recess that surrounds said face portion;
   a bladder member disposed in said recess, a portion of said bladder member being compressed between said face portion and said base portion to secure said bladder member within said recess, said bladder member forming an inflatable bladder defining an interior chamber; and
   an adhesive disposed proximate said recess and between portions of said bladder member.

11. The head form assembly of claim 10, wherein said bladder member includes first and second flange portions that are compressed between said face portion and said base portion to define said interior chamber, said flange portions cooperating to define an inlet to said interior chamber.

12. The head form assembly of claim 11 further defining a passageway that passes into said head form assembly, said passageway being in fluid communication with said inlet, said passageway being adapted for connection with a pressure source for inflation of said inflatable bladder.

13. The head form assembly of claim 12 wherein a plenum is defined between said passageway and said inlet to said interior chamber.

14. The head form assembly of claim 10 further comprising a plurality of clips adapted to secure a mask to the base portion.

15. The head form assembly of claim 10 wherein said head form assembly approximates the full shape of a human head.

16. The head form assembly of claim 10 wherein said base portion includes a neck portion adapted to test respirators that seal around said neck portion.

17. The head form assembly of claim 10 further comprising an adaptor adapted to establish a flow circuit through said head form assembly for detection of leaks in said head form assembly.

18. A head form assembly for respirator testing, comprising:
   a face portion;
   a base portion that cooperates with said face portion, said face portion and said base portion cooperating to define a recess that surrounds said face portion;
   a bladder member disposed in said recess, a portion of said bladder member being compressed between said face portion and said base portion to secure said bladder member within said recess, said bladder member forming an inflatable bladder defining an interior chamber; and
   an adaptor adapted establish a flow circuit through said head form assembly for detection of leaks in said head form assembly.

19. The head form assembly of claim 18, wherein said bladder member includes first and second flange portions that are compressed between said face portion and said base portion to define said interior chamber, said flange portions cooperating to define an inlet to said interior chamber.

20. The head form assembly of claim 19 further defining a passageway that passes into said head form assembly, said passageway being in fluid communication with said inlet, said passageway being adapted for connection with a pressure source for inflation of said inflatable bladder.

21. The head form assembly of claim 20 wherein a plenum is defined between said passageway and said inlet to said interior chamber.

22. The head form assembly of claim 18 further comprising a plurality of clips adapted to secure a mask to the base portion.

23. The head form assembly of claim 18 wherein said head form assembly approximates the full shape of a human head.

24. The head form assembly of claim 18 wherein said base portion includes a neck portion adapted to test respirators that seal around said neck portion.

25. The head form assembly of claim 18 further comprising an adaptor adapted to establish a flow circuit through said head form assembly for detection of leaks in said head form assembly.

26. The head form assembly of claim 18, further comprising an adhesive disposed proximate said recess and between portions of said bladder member.

* * * * *